United States Patent
Potts et al.

(10) Patent No.: US 12,042,843 B2
(45) Date of Patent: Jul. 23, 2024

(54) FASTENER INSTALLATION SYSTEM WITH SPLIT TOOL HEAD AND ACTUATION BASE

(71) Applicant: Gage Bilt, Inc., Clinton Township, MI (US)

(72) Inventors: Tony P. Potts, Warren, MI (US); Brian H. Leigh, Macomb, MI (US); Kyle R. Lang, Clarkston, MI (US)

(73) Assignee: Gage Bilt, Inc., Clinton Township, MI (US)

( * ) Notice: Subject to any disclaimer, the term of this patent is extended or adjusted under 35 U.S.C. 154(b) by 190 days.

(21) Appl. No.: 16/909,419

(22) Filed: Jun. 23, 2020

(65) Prior Publication Data

US 2021/0107054 A1  Apr. 15, 2021

Related U.S. Application Data

(60) Provisional application No. 62/913,403, filed on Oct. 10, 2019.

(51) Int. Cl.
*B21J 15/10* (2006.01)
*B21J 15/22* (2006.01)
*F16B 19/05* (2006.01)

(52) U.S. Cl.
CPC ............. *B21J 15/105* (2013.01); *B21J 15/22* (2013.01); *F16B 19/05* (2013.01)

(58) Field of Classification Search
CPC ................................ B21J 15/105; B21J 15/22
See application file for complete search history.

(56) References Cited

U.S. PATENT DOCUMENTS

| | | | | |
|---|---|---|---|---|
| 2,329,709 | A | * | 9/1943 | Fischer .................... B21J 15/22 60/563 |
| 2,521,048 | A | | 9/1950 | Day |
| 3,001,548 | A | * | 9/1961 | Van Hecke ............ F15B 11/02 91/452 |
| 3,143,903 | A | | 8/1964 | Van Hecke |
| 3,180,017 | A | * | 4/1965 | Simmons ............... B21J 15/022 72/352 |
| 3,654,792 | A | * | 4/1972 | Mead ..................... B21J 15/105 72/391.8 |
| 3,698,231 | A | | 10/1972 | Davis, Jr. |
| 3,760,485 | A | | 9/1973 | Smith |

(Continued)

OTHER PUBLICATIONS

FrightProps, Types of Pneumatic Cylinders Explained, YouTube, available at https://www.youtube.com/watch?v=0KNPDr-OMeo&t=3s, Published on May 27, 2016 (Year: 2016).*

*Primary Examiner* — Kyle A Cook
(74) *Attorney, Agent, or Firm* — Young Basile Hanlon & MacFarlane, P.C.

(57) ABSTRACT

A fastener application device comprising an hydraulically-operated tool head held by an operator and having an actuator trigger, a base structure having an air-operated power cylinder operatively attached to an hydraulic cylinder to supply hydraulic pressure to the tool head in response to operation of the actuator trigger. The tool head and base structure are connected only by air and oil lines that are long enough to allow the base structure to be supported on, for example, a workbench, requiring the tool operator to support only the weight of the tool head during a fastener installation sequence.

2 Claims, 4 Drawing Sheets

(56) References Cited

U.S. PATENT DOCUMENTS

| | | | |
|---|---|---|---|
| 4,027,520 A * | 6/1977 | Klein | B21J 15/32 |
| | | | 29/522.1 |
| 4,598,571 A * | 7/1986 | Oefinger | B21J 15/326 |
| | | | 72/453.17 |
| 4,604,889 A | 8/1986 | Sukharevsky | |
| 4,674,367 A | 6/1987 | Aab et al. | |
| 4,704,888 A * | 11/1987 | Frearson | B21J 15/105 |
| | | | 29/243.53 |
| 4,852,376 A * | 8/1989 | Suhov | B21J 15/105 |
| | | | 72/453.17 |
| 5,142,774 A | 9/1992 | Jeffery | |
| 5,143,216 A | 9/1992 | Aurtoi et al. | |
| 5,167,327 A | 12/1992 | Mondello | |
| 5,385,434 A | 1/1995 | Quinn et al. | |
| 5,490,311 A * | 2/1996 | Rosier | B21J 15/105 |
| | | | 29/243.523 |
| 5,519,926 A * | 5/1996 | Rosier | B21J 15/20 |
| | | | 29/243.529 |
| 5,579,641 A * | 12/1996 | Wilcox | B21J 15/22 |
| | | | 72/391.2 |
| 5,697,521 A | 12/1997 | Dixon | |
| 6,253,448 B1 | 7/2001 | Zieve et al. | |
| 6,272,899 B1 | 8/2001 | Bentivogli | |
| 6,662,420 B1 | 12/2003 | Rosier | |
| 6,748,642 B2 | 6/2004 | Tsegga et al. | |
| 6,907,648 B2 | 6/2005 | Eldessouky | |
| 7,677,853 B2 | 3/2010 | Donovan | |
| 7,921,530 B2 | 4/2011 | Mercer et al. | |
| 8,302,272 B2 | 11/2012 | Dear et al. | |
| 9,296,076 B2 | 3/2016 | Soto Martinez et al. | |
| 9,316,247 B2 | 4/2016 | Butvin et al. | |
| 9,511,416 B2 | 12/2016 | Godfrey et al. | |
| 9,586,257 B2 | 3/2017 | Godfrey et al. | |
| 10,081,050 B2 | 9/2018 | Godfrey | |
| 2004/0148747 A1 * | 8/2004 | Woyciesjes | F15B 3/00 |
| | | | 29/243.521 |
| 2004/0205950 A1 | 10/2004 | Schmitt | |
| 2006/0026812 A1 | 2/2006 | Villanueva | |
| 2011/0252626 A1 | 10/2011 | Williams | |
| 2011/0289769 A1 | 12/2011 | Skolaude | |
| 2013/0247890 A1 | 9/2013 | Gilley | |
| 2014/0201972 A1 | 7/2014 | Butvin et al. | |
| 2015/0184689 A1 | 7/2015 | Godfrey et al. | |
| 2015/0252833 A1 | 9/2015 | Brewer et al. | |
| 2018/0073539 A1 | 3/2018 | Suttles | |
| 2020/0114480 A1 | 4/2020 | Lang et al. | |

\* cited by examiner

FASTENER INSTALLATION SYSTEM WITH SPLIT TOOL HEAD AND ACTUATION BASE

CROSS-REFERENCE TO RELATED APPLICATIONS

This application claims priority to and benefit of U.S. Provisional Application No. 62/913,403 filed Oct. 10, 2019 and incorporates herein the entirety of that application.

TECHNICAL FIELD

This invention relates to installation tools for fasteners such as pintail lock-bolts and more particularly to a fastener installation device having separate tool head and pneumatic/hydraulic actuation base joined only by hydraulic and pneumatic hoses so that the operator handling the tool head during a lockbolt installation sequence does not have to bear the weight of the actuation base during a fastener installation sequence.

BACKGROUND

Fasteners in the form of "lockbolts" having a head and a grooved shank adapted to have a lock collar permanently swaged onto it have been in widespread use since as early as 1989. The bolt shank is placed through holes pre-formed in the layers of materials to be joined. The collar is then placed on the shank and swaged by a tool so as to be permanently deformed into the grooves in the shank. The collar then serves as a nut opposite the lockbolt head but is essentially non-removable by conventional procedures.

Tools and collar feed equipment are shown and described in U.S. Pat. Nos. 9,316,247, 9,511,416, 9,586,257, and 10,081,050, all assigned to Gage Bilt, Inc. of Clinton Township, Michigan. The tool comprises a nose assembly to perform the lockbolt and collar installation process.

SUMMARY OF THE DISCLOSURE

The presently disclosed fastener application device is characterized by a base which houses a main air cylinder and an hydraulic oil reservoir. The air cylinder is integral with and operatively connected to the hydraulic cylinder capable of operating a puller-type tool head via hydraulic lines. The device further comprises a tool head capable of receiving and actuating a nose assembly so as to act as a fastener installation tool for locating and collar swaging steps. The base and the tool head are physically separate, joined only by flexible hydraulic hoses and air lines. The operator, therefore, can perform a lockbolt installation process lifting only the tool head and does not have to lift or hold the base structure. This saves the operator substantial energy and makes the installation of multiple fastener faster and less tiring.

The air lines are associated with an operator-controlled actuator on the tool head handle and the hydraulic lines connect the hydraulic oil in the base housing to the tool head where it acts on a puller piston. The tool head is designed to receive a standard nose assembly (not shown) such as the nose assembly available from Gage Bilt, Inc. of Clinton Township, Michigan.

When the operator depresses the actuator trigger on the tool head, air is directed from the base through the tool head to a reverse acting air cylinder mounted on the top of the base to pull up on a rod and toggle a lever arm in the base housing which, in turn, operates a valve on the side of the base to direct air to the bottom of a pneumatic piston, placing it in the "pull" mode by moving the piston up in the cylinder housing. This movement, in turn, displaces an hydraulic piston to pressurize hydraulic fluid in the hydraulic line attached to the tool head causing a piston in the tool head to move in a direction which, by way of the nose assembly, initiates the "pull" cycle of a fastener installation process.

When the tool head actuator is released, the reverse acting air cylinder allows a spring in the throttle valve to move the valve to a return position causing air to be applied under pressure to the top of the air piston in the base while air below the piston is exhausted. This in turn moves the hydraulic piston downward to reverse the direction of hydraulic oil pressure in the tool head thereby returning the piston in the tool head to its original ready position. The air and oil lines can be any convenient length. The principal advantage of this arrangement is to relieve the operator of the task of lifting and supporting the base structure during a multiple fastener installation sequence.

BRIEF DESCRIPTION OF THE DRAWINGS

The disclosed device and the novel aspects of it will be best understood by reference to the attached drawings of which.

DETAILED DESCRIPTION

Figure 1:
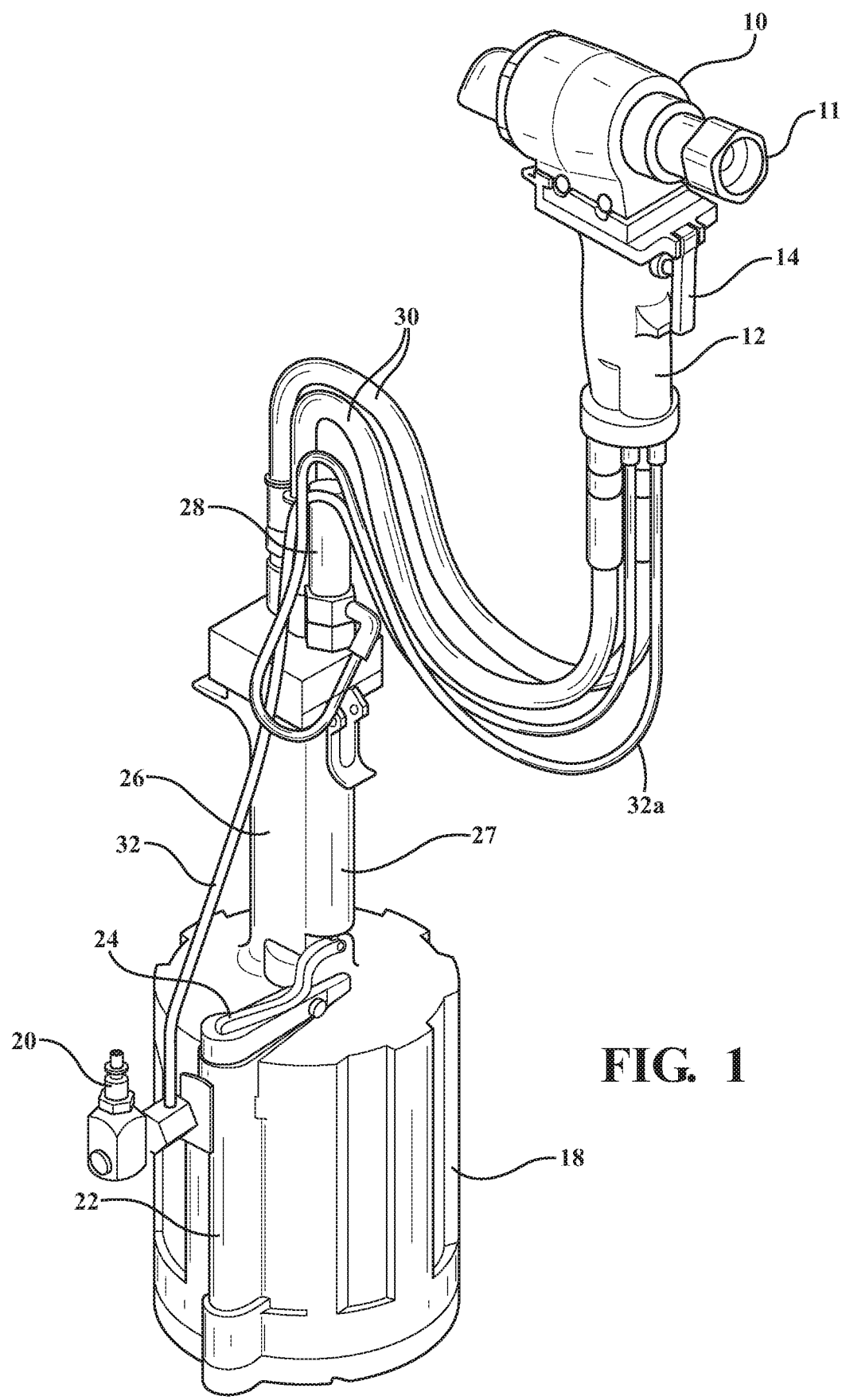
FIG. 1 is a perspective view of the split system showing the air cylinder base with integral hydraulic cylinder, lever arm, and throttle valve, and the separate tool head, the base and tool head being interconnected by air and oil lines.
Figure 2:
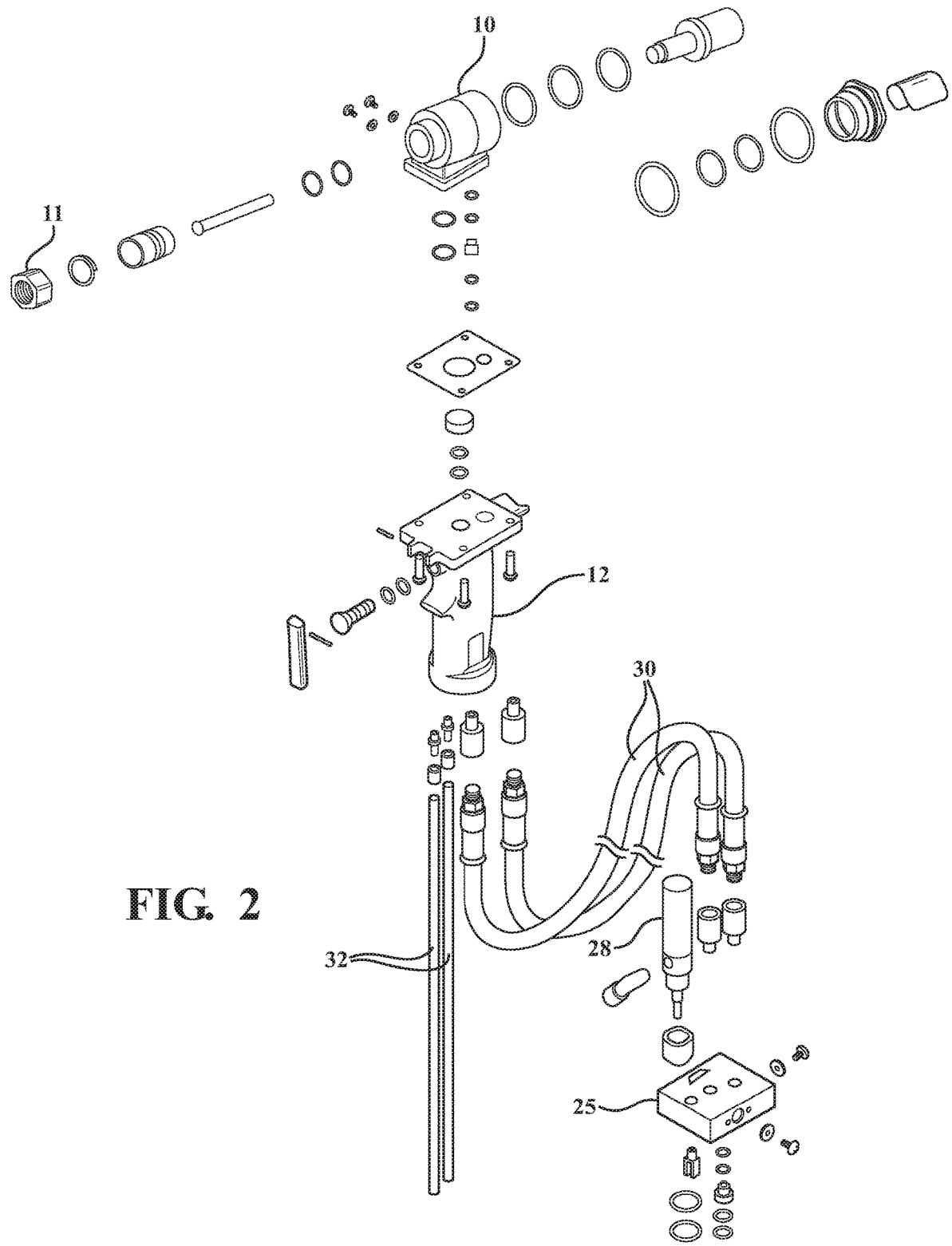
FIG. 2 is an exploded view of the tool head and a portion of the pneumatic/hydraulic actuator system components.

Referring to the drawings, FIG. 1 shows the overall device to comprise a tool head 10 having a handle 12 with an operator-controlled actuator lever or trigger 14 that is pulled to initiate a lockbolt installation sequence. The tool head has a fitting 11 to receive a nose assembly for, by way of example, a lockbolt fastener installation involving a "pull" and "return" cycle.

The device further includes a base 18 housing an air cylinder having a piston 36 and an inlet 20 for air from a compressor (not shown). The base housing 18 includes an integral upper housing 26 and a reverse-acting pneumatic cylinder 28. Housing 26 has a side portion 27 that holds a vertical rod 34 connected to control a lever arm 24 pivotally mounted on top of the larger-diameter portion of the base further includes a throttle valve 22 controlled by the position of the lever arm 24. The weight of the base structure is about 11 pounds.

Figure 3:
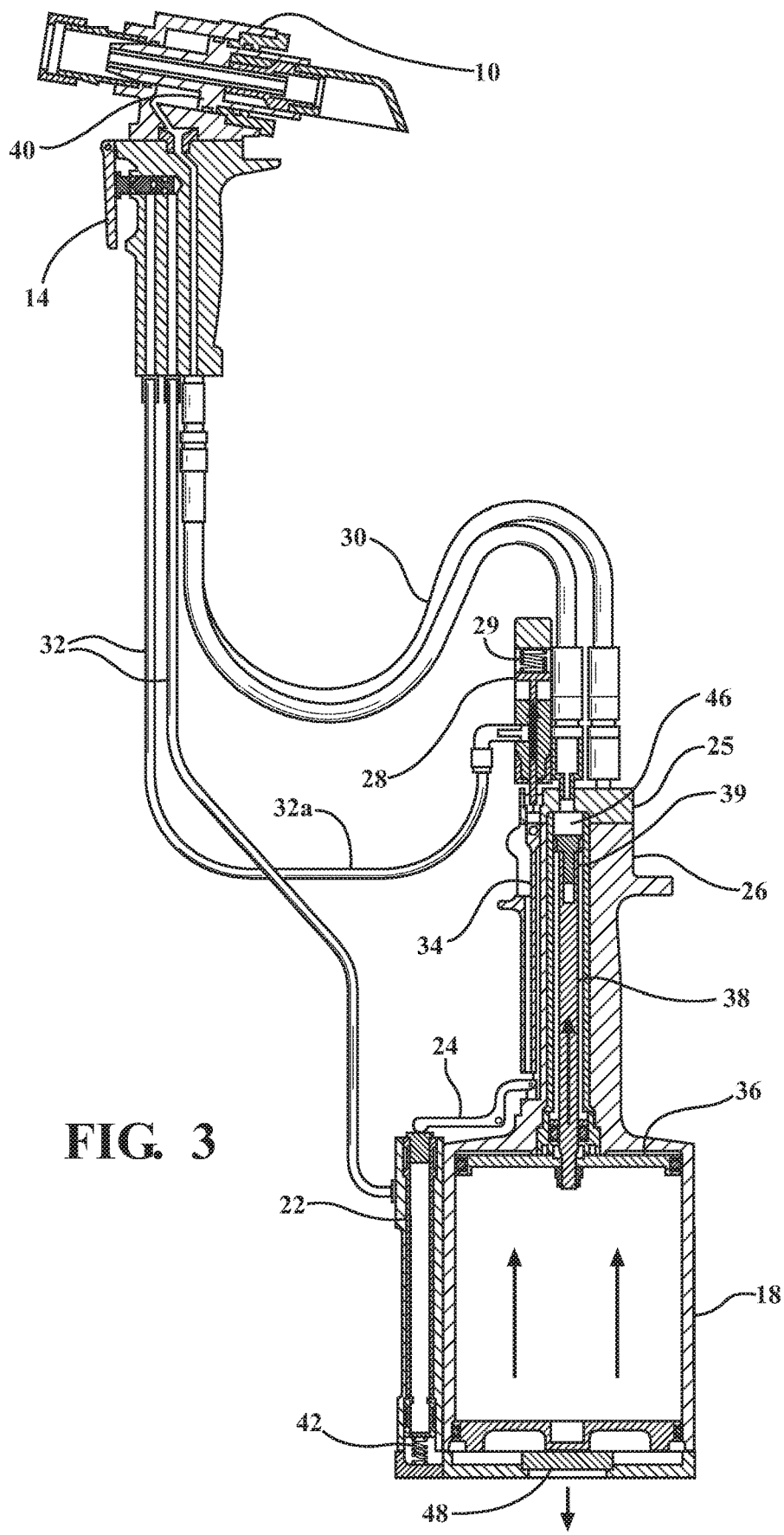
FIGS. 3 and 4 are sectional diagrams of the pneumatic/hydraulic cylinder and tool head in the pull and return cycle positions, respectively.
Figure 4:
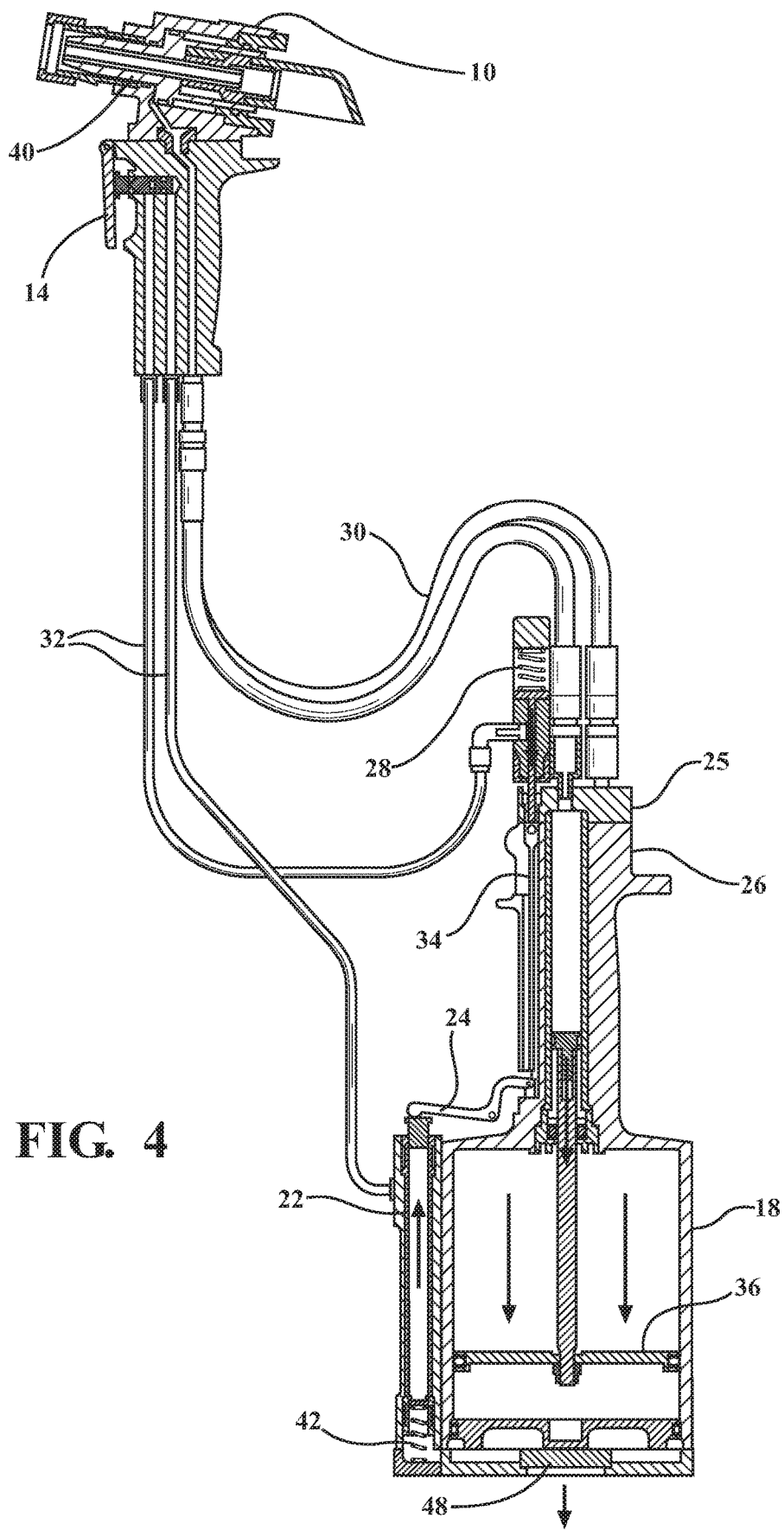

Referring to FIGS. 3 and 4, more detail is shown. The throttle valve 22 is operated in part by an internal spring 42 that pushes up, and in part by the lever arm 24 which is toggled back and forth by means of the rod 34 in the cylinder 27. The rod is operated by the reverse acting air cylinder 28 which is mounted on block 25 on top of the hydraulic cylinder in housing 26. Hydraulic lines 30 interconnect the hydraulic cylinder housing 26 with the tool head 10 to operate the tool head by air pressure in a manner to be described. In addition, air lines 32 interconnect the base with the tool head such that operation of the actuator trigger 14 can initiate a pull sequence as described below.

FIG. 3 shows the device in a pull cycle, wherein the tool head 10 operates by way of a piston 40 to pull on the nose assembly (not shown) to the right as shown in FIG. 3 to initiate the first step in a fastener installation process. Depressing the actuator 14 causes air to flow through line 32a to the reverse acting cylinder 28 which pulls the rod 34 up. This lifts the right side of pivotally mounted lever arm 24 upwardly as shown in FIG. 3. This causes the left-hand side of the pivotally mounted lever arm 24 to move downwardly. This downward movement pushes the main body of the throttle valve 22 down against the action of return spring 42 causing air under pressure to flow to the bottom side of the air-operated power piston 36 while air above the piston is routed through the valve 22 to an exhaust 48. This pushes the piston rod assembly 38, 39 upwardly, applying pressure to the closed-loop hydraulic fluid reservoir 46, which in turn pressurizes a line 30 and pushes against the piston 40 in the tool head to move the piston from left to right as shown in FIG. 3. When the actuator 14 is released, the rod 34 moves down, allowing the spring 42 to push the throttle valve upwardly, applying air pressure to the top of the air piston 36 and exhausting air below the piston as shown in FIG. 4.

During the return cycle, air from the top of the piston 36 is exhausted through the center of the throttle valve and into the exhaust port 48. The hydraulic system is a closed-loop system of fixed volume and can be cycled in both directions. The air system is open-loop and requires constant input of air pressure from a conventional compressor via fitting 20.

The reverse-acting air cylinder 28 uses an internal spring 29 to reverse after the actuator 14 is released, cutting off air to the cylinder. This type of cylinder can be replaced with a reverse-acting cylinder that uses air for the return motion via an additional air line connection. These alternatives provide equivalent operation in a substantially similar fashion.

Summarizing, the actuator trigger 14 causes air to flow to the cylinder 28 which then toggles the lever arm 24 to cause the valve 22 to admit to and exhaust air from the power piston 36. That, in turn, powers the hydraulic cylinder 34 to supply hydraulic oil under pressure to the tool head.

As described the system overall allows the operator to bear only the weight of the tool head, while the base 18 can be separately supported on, for example, a work bench or cart. The hydraulic and air lines are the only weight-bearing connectors between the base structure 26 and the tool head 10 and can be as long as necessary to achieve the desired mobility, but a typical length is from 4 to 8 feet.

What is claimed:

1. A fastener installation system adapted to operate a hydraulic tool through an installation sequence consisting of pull and return movements comprising:
  a tool head adapted to receive a hydraulic tool having pull and return movements; said tool head having an air valve mounted therein and a hand operated trigger for opening and closing the air valve;
  a power base physically separate from the tool head and having a pressurized air inlet, said power base further defining a lower air chamber and an upper hydraulic reservoir therein, said air chamber and hydraulic oil reservoir having respective mechanically interconnected pistons therein whereby movements of the air chamber piston by air pressure acting thereon move the hydraulic oil reservoir piston in the same direction;
  toggle means including a reverse acting air cylinder mounted on said base for producing movement of the air chamber piston as the trigger on the tool head is pulled and released to open and close the trigger air valve;
  first and second oil lines extending between the oil reservoir and the tool head to establish a closed loop oil circuit to sequentially activate the hydraulic tool through pull and return movements when the trigger operated air valve is opened and closed;
  a first flexible air line extending from the air inlet to the trigger operated air valve;
  a second flexible air line extending from the trigger operated air valve to the reverse acting air cylinder; and
  the flexible air and oil lines being the only structural connections between the tool head and the power base whereby operation of the trigger operated air valve produces movement of the air chamber and the oil reservoir pistons to activate the hydraulic tool on the tool head between pull and return movements for fastener installation purposes without requiring an operator to lift and bear the weight of the power base.

2. A fastener installation device comprising:
  a tool head adapted to receive and operate a hydraulic fastener installation tool through pull and return strokes using oil pressure;
  said tool head having an air valve and a manual trigger having pulled and released positions connected to operate the air valve between open and close conditions;
  a base body structurally separate from said tool head and having therein an air chamber with a piston and an oil reservoir with a piston, the air chamber piston and the oil reservoir piston being mechanically connected for co-operative movement;
  said base body having an inlet connectable to a pressurized air source;
  a reverse acting air cylinder mounted on said base and connected to said air inlet via a first flexible air line extending from said inlet to said air valve and a second flexible air line extending from said air valve back to said reverse acting air cylinder;
  a spring biased toggle system connected between said reverse acting air cylinder and said air chamber whereby said air chamber piston is sequentially moved up and down in said air chamber when said trigger opens and closes the air valve;
  first and second flexible hydraulic lines connected between said oil reservoir and said tool head to form a closed loop hydraulic circuit operating the installation tool on said tool head through pull and return stroke when the manual trigger is cycled between the pulled and released conditions; and
  the flexible air and hydraulic lines being the only structural connections between the base body and the tool head whereby an operator can use the tool head and tool to install fasteners without lifting or bearing the weight of the base body.

* * * * *